Patented Sept. 28, 1926.

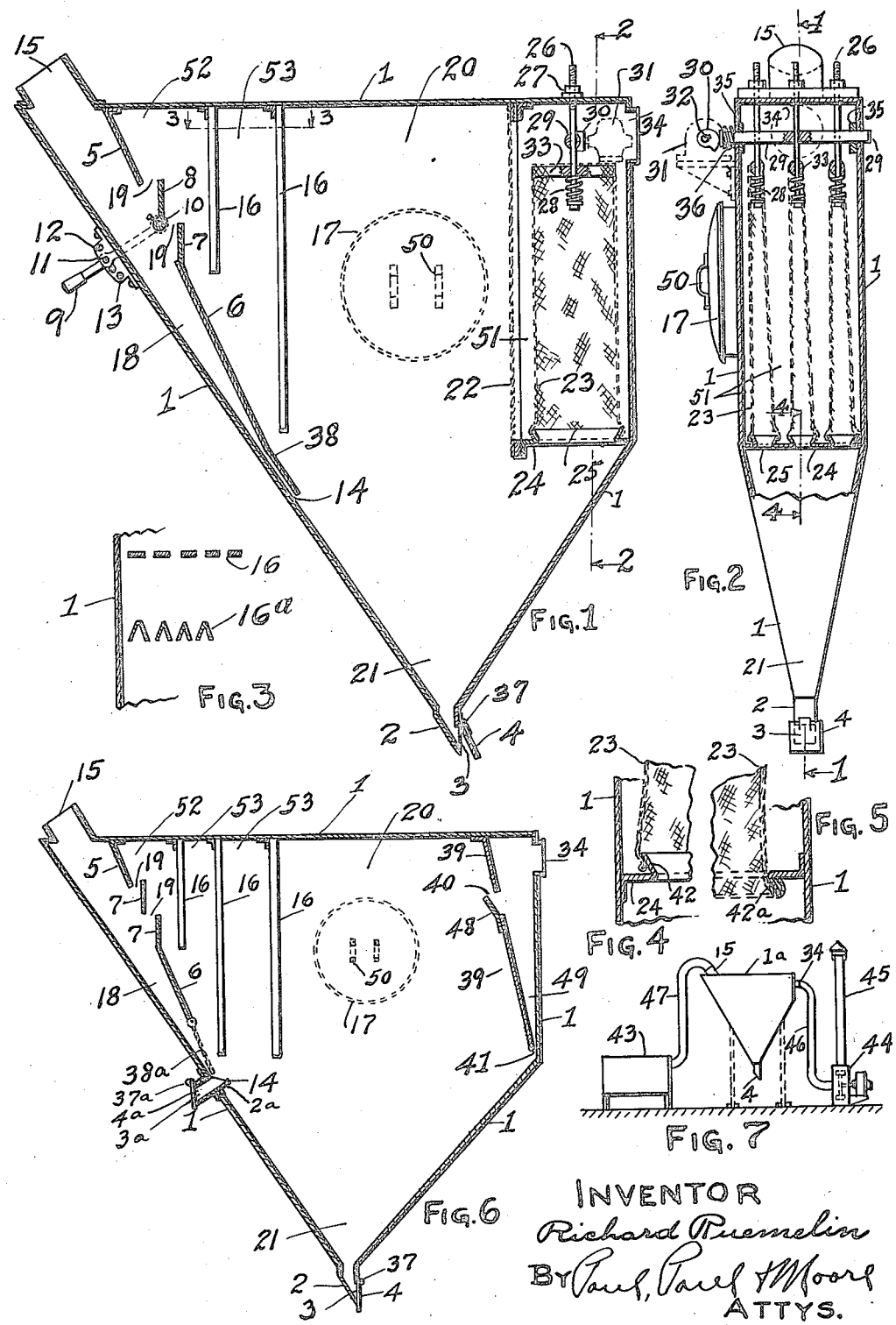

1,601,148

UNITED STATES PATENT OFFICE.

RICHARD RUEMELIN, OF ST. PAUL, MINNESOTA.

DUST SEPARATOR.

Application filed November 2, 1922. Serial No. 598,683.

My invention relates to an apparatus for separating or removing, floating dust, grit, sand or other particles heavier than air from the transporting air current, such air current being transmitted inside of piping, or ducts to the separator under pressure or vacuum created by a fan or blower.

A further object is to recover such dust in an enclosed hopper and prevent the escape of this dust into the surrounding atmosphere, where it will cause unsanitary working conditions for workmen or persons, or damage to buildings, machinery or property, especially in foundries or industries where they operate machinery generating dust of a gritty or destructive nature.

A further object is to permit locating the separator between the source of dust generation and the exhaust fan, so that the fan handles only cleaned air and is thus not exposed to the severe wear caused by handling gritty dust laden air.

A further object is to prevent considerable wear on the inside surfaces of the separator when handling gritty air, as the air currents upon entering the separator are immediately expanded, thereby causing a low velocity of air and depositing of the heavier grit particles.

A futher object is to combine in one apparatus with modifications a separator adapted for the recovery of both the heavy and all floating dust, and a separator recovering only the heavier dust.

A further object is to cause separation of all dust particles by centrifugal force, expansion, low velocity, and by filtration through screens all in one apparatus.

A further object is to cause separation in this apparatus with modifications so that only the heavier dust particles are recovered.

A further object is the simple and flexible support for the dust screens and a means for removing the accumulated dust particles from all such screens.

A further object is to remove all heavy and most of the gritty dust particles from the air currents before such air currents reach the screens, thereby considerably reducing, wear on screens, less dust accumulation on screens, less shaking required to keep them clean, and a possibility of reducing the area of the screens and their cost.

Other objects of the invention will appear from the following detailed description.

Figure 1 is a sectional side elevation along the line 1—1 in Figure 2;

Figure 2 is a sectional end elevation along the line 2—2 in Figure 1;

Figure 3 is a sectional plan elevation along the line 3—3 in Figure 1;

Figures 4 and 5 show several methods of fastening the screens to the bottom plate;

Figure 6 is a sectional side elevation showing a modified separator when omitting the screens;

Figure 7 shows a diagram in which the separator is subjected to a vacuum created by an exhaust fan.

In the drawing 1 represents the outer walls or casing of the separator, the bottom walls of this casing converging and forming a hopper 21 for the accumulation of precipitated dust or sand particles, said hopper having at its apex the dust chute 2 and a spout opening 3 for the discharge of precipitated dust or sand. The swinging door 4 hinged at 37 automatically opens to discharge when there is sufficient pressure, caused by the weight of the accumulated dust in hopper 21 and automatically closes when the hopper is drained to avoid the escape or entry of air through this door. The partition walls 5 and 6 together with the casing walls 1 form an inclosed-wedge shaped expansion and centrifugal separating chamber 18.

The deflectors for the dust laden air may be supported stationary as 7, or adjustably as shown by 8 for the regulation of dust separation and air flow through the port 19; the deflector 8 and the adjusting lever 9 being keyed to the hinge shafts 10; adjustment of lever 9 being obtained by the lever pin 11 engaging any of the holes 12 in the stationary segments 13.

Precipitated dust or sand inside of the chamber 18 is drained into the hopper 21 through the narrow slot or opening 14, this opening being elongated by the shield 38 in order to reduce the velocity of such sand particles. Dust laden air is transmitted by suction or pressure from the source of dust generation 43 through suitable piping 47 and enters the wedge shaped chamber 18 of the separator through the pipe 15. The air current upon entering the upper portion of this chamber is expanded due to the enlarged area, thereby causing a reduction in its velocity of flow. The air current in passing from chamber 18 to expansion chambers 52—53—20 is compelled to make a sharp bend upon entering the ports 19, thus producing centrifugal action. Due to the low velocity of the air currents and its centrifugal action practically all dust particles heavier than air are forced into the apex of the wedge chamber and precipitated. While the air current passes from the expansion chambers 52 and 53 into chamber 20, suitable diffusers 16 and 16$^a$ diffuse or distribute the air current so as to produce a uniform velocity of the air throughout these chambers, and also avoiding a whirling or short circuit action.

The surface of these diffusers may be made flat as shown in 16 or corrugated as shown by 16$^a$ or any other suitable shape. When these diffusers are formed similar to 16$^a$, additional dust separation is obtained on account of the heavier dust particles losing their velocity when entering the pocket formed in the apex of the diverging sides of the blades. The dust laden air current travels horizontally at comparatively low velocity through the enlarged expansion chambers 52—53 and 20, and on account of this low velocity a considerable amount of its suspended dust is deposited in the dust hopper 21. In order to cause a further separation of the fine floating dust particles, the dust laden air current is compelled to pass through the flat screen 22 and the bag screen 23, causing the dust particles to be deposited on the surface of these screens, while the clean air enters the clean air chamber 51. The screen surfaces are preferably made of cloth, although other materials may be used for this purpose. The clean air chamber 51 is an enclosed compartment formed by the walls 1 of the casing on three sides, the bottom plate 24 on the bottom and the flat screen 22 on the front. The bottom plate 24 is provided with openings 25 for the entry of the dust laden air currents as shown by 42 and 42$^a$ or other suitable method for attaching the screen bags to this plate, thereby forming a positive connection for the bags. A flexible suspension for the screen bags 23 is provided by the adjustable suspension rods 26 with nuts 27 supported on casing 1, the bars 33 attached inside of the bags 23 being provided with springs 28 supported by rods 26. In order to prevent choking of the bag screen surfaces due to deposited dust it is necessary that such dust be removed occasionally by shaking the bags and causing such dust to be deposited in the hopper 21. By sliding connections, the vibrator rod 29 engages all the suspension rods 26. The bags 23 are given a quick lateral, or sidewise vibration, when the rod 29 is caused to reciprocate by the rotation of cam or eccentric 30; rotation of cam 30 being obtained by the electric motor 31 with its extended shaft 32. Other suitable means may be employed for shaking the bags for the removal of dust deposited on their surfaces. The cleaned air is withdrawn from the chamber 51 through the exhaust pipe 34. When using an exhaust fan for the air current, opening 34 is connected by suitable piping 46 to exhaust fan 44 and the air exhausted through vent pipe 45. To prevent the mixture of heavy dust deposited in chamber 18 with the light weight dust particles in hopper 21, the opening 14 may be provided with the hinged or adjustable shield 38$^a$, having a dust chute 2$^a$, spout opening 3$^a$, and a swinging door 4$^a$, hinged at 37$^a$, for the separate discharge of heavy dust or sand.

When operating conditions do not require the separation or recovery of all the floating or lightest weight dust, the screens 22 and 23 may be omitted. The partition walls 39—39 and casing walls 1 form the enclosed wedge-shaped expansion and centrifugal separation chamber 49, this chamber being provided with deflector 48 for the air port 40, and having a dust discharge opening 41. A manhole 17 having handles 50 is provided for access to the interior of the casing 1.

I claim as my invention:

1. A dust separator comprising a casing having a sand chamber in the lower portion thereof, and an intake opening in the upper portion, a centrifugal separating chamber provided at one side of said casing and communicating with said intake opening, a separating means arranged in the upper portion of said casing to receive the air moving horizontally from said centrifugal separator, and a screen in the upper portion of said casing opposite said chamber whereto the horizontally moving currents of air are delivered.

2. A dust separator comprising a casing having a sand chamber in the lower portion thereof, and an intake opening for the dust and sand laden air in the upper portion, a separating chamber within said housing communicating with said air intake opening and having a wall extending from the top of said casing to a point adjacent a side wall thereof and separated therefrom by a narrow discharge opening through which the precipitated sand may flow into said sand chamber, said chamber wall having an air discharge opening the wall of said casing on the opposite side thereof from said chamber having an air exhaust opening and air diffusers depending within said casing between the wall of said separating chamber and said air discharge opening.

3. A separator comprising a casing having a sand collecting chamber in the lower portion thereof, an intake for the dust and sand laden air, said casing having an air chamber in its upper portion communicating with said air intake opening and provided in its lower walls with a narrow discharge opening through which the precipitated sand may flow by gravity into said sand chamber, the upper walls of said air chamber having air discharge passages and means for compelling the air to follow a tortuous path therethrough, the wall of said casing on the other side thereof from said air chamber having an air discharge opening, and air diffusers depending within said casing between said tortuous air passages and said air discharge opening.

4. A separator comprising a casing having a sand chamber in its lower portion, the upper portion of said casing having oppositely arranged air intake and discharge openings, an air chamber communicating with said air intake opening and having a port in its lower walls, for the discharge of the precipitated sand therein, the upper portions of said air chamber having air discharge passages, an upright air screening device provided adjacent said discharge opening on the other side of said casing from said air chamber, and through which the air must pass to said opening, and means between said screening device and said air chamber for compelling the air discharged from said chamber to follow a tortuous path before reaching said screening device.

5. A separator comprising a casing having a sand collecting chamber in the lower portion thereof, and air intake and discharge openings oppositely arranged in the upper portions thereof, an air chamber provided in said casing adjacent to and communicating with said air intake opening, and having a discharge passage at its lower end for the flow of sand into said sand chamber, the inner walls of said air chamber near the top of said casing having air discharge passages, a screening device adjacent said discharge opening and comprising a screen through which the air must pass before reaching said discharge opening, and dust collecting sacks provided between said screen and said discharge opening.

6. A dust separator comprising a casing having a sand chamber in the lower portion thereof, air intake and discharge openings oppositely arranged in the upper portion, an air chamber adjacent to and communicating with said air intake opening and having passages in its inner side wall for the discharge of the air currents, and an upright screen device interposed between said discharge opening and said air chamber and comprising screens above said sand chamber and through which the currents of air must pass before reaching said discharge opening.

7. A dust separator comprising a casing having an intake opening in its top, a wall depending from said top to a point adjacent a side wall of said casing and spaced therefrom to form a sand discharge opening, said wall and the opposite wall of said casing forming a separating chamber communicating with said inlet opening, said chamber wall having an opening therein and a valve for regulating the flow of air through said opening into said casing, baffles depending from said top adjacent said separating chamber and compelling the air to follow a tortuous path therein, a wall of said casing remote from said inlet opening having an air discharge opening and a screen device located between said air discharge opening and said baffles substantially as described.

In witness whereof, I have hereunto set my hand this 28th day of October 1922.

RICHARD RUEMELIN.